United States Patent [19]
Rose

[11] Patent Number: 5,676,393
[45] Date of Patent: Oct. 14, 1997

[54] PROTECTIVE COVER FOR AIRBAG MODULE

[75] Inventor: Larry D. Rose, Layton, Utah

[73] Assignee: Morton International, Inc., Chicago, Ill.

[21] Appl. No.: 693,365

[22] Filed: Aug. 6, 1996

[51] Int. Cl.⁶ ............................................ B60R 21/16
[52] U.S. Cl. ............................ 280/728.3; 24/30.5 P; 24/588; 280/728.1; 280/728.2; 403/291
[58] Field of Search ................... 280/728.3, 728.1, 280/728.2, 731, 732; 403/291; 24/16 PB, 20 R, 17 AP, 588, 30.5 P

[56] References Cited

U.S. PATENT DOCUMENTS

| | | | |
|---|---|---|---|
| 3,592,428 | 7/1971 | McFarlane | 24/16 PB |
| 3,654,049 | 4/1972 | Ausnit | 24/16 PB |
| 4,881,301 | 11/1989 | Sweeney et al. | 24/16 PB |
| 4,941,678 | 7/1990 | Lauritzen et al. | 280/728.3 |
| 5,062,664 | 11/1991 | Bishop et al. | 280/728.2 |
| 5,335,936 | 8/1994 | Faigle et al. | 280/728.2 |
| 5,335,937 | 8/1994 | Uphues et al. | 280/732 |
| 5,474,325 | 12/1995 | Daines et al. | 280/728.3 |
| 5,527,062 | 6/1996 | Kreuzer | 280/732 |

*Primary Examiner*—Eric D. Culbreth
*Attorney, Agent, or Firm*—George W. Rauchfuss, Jr.; Gerald K. White

[57] ABSTRACT

A protective cover for a passenger side airbag module is extruded as a sheet of plastic which is cut to form a rectangle. One extruded edge of the rectangle defines a male connector and the opposite extruded edge defines a female connector. The sheet is wrapped around the module and the ends are interconnected. In a further embodiment, two separate panels having such connectors are anchored to the module and interconnected over the folded airbag.

6 Claims, 3 Drawing Sheets

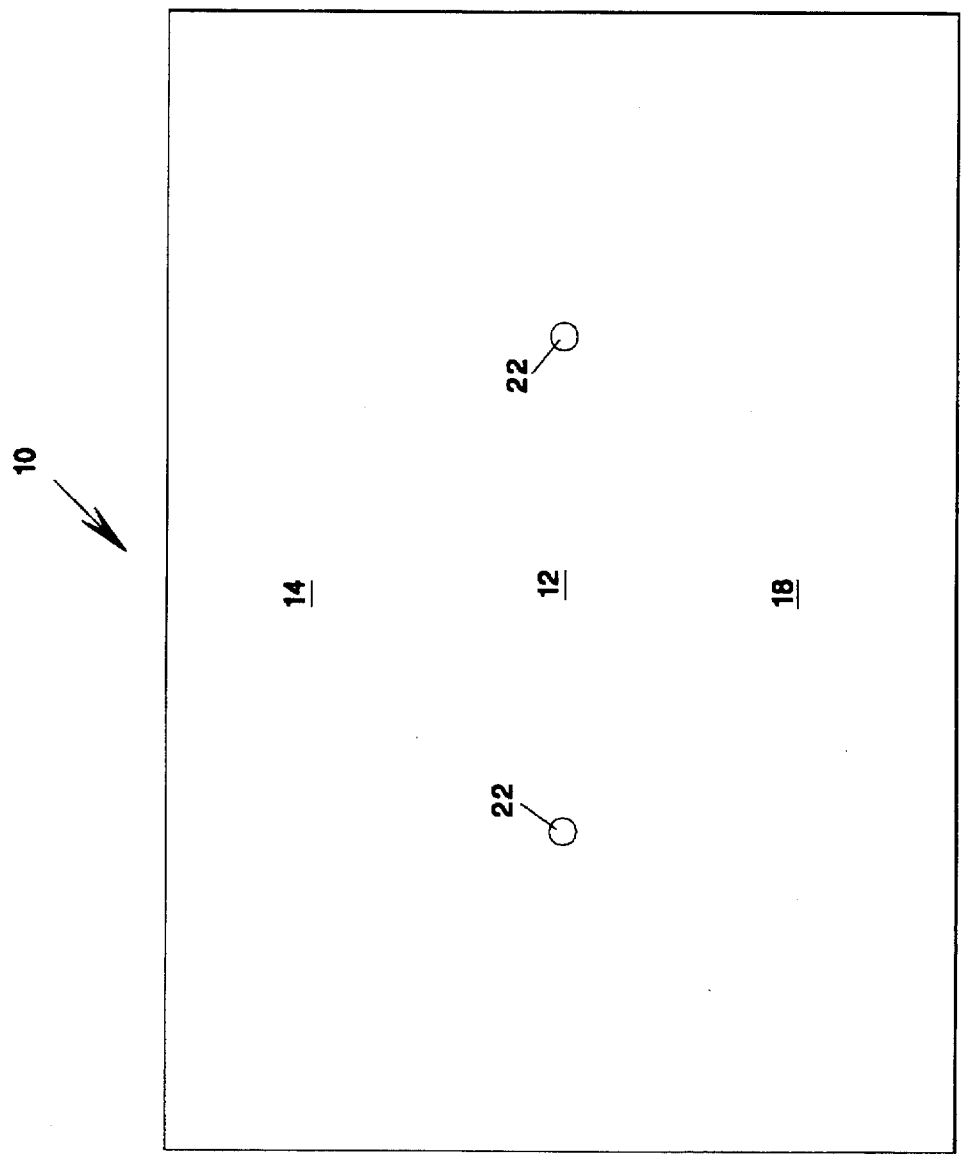

5,676,393

PROTECTIVE COVER FOR AIRBAG MODULE

TECHNICAL FIELD

This invention pertains to the field of automotive airbags. More particularly, it pertains to a protective cover for a passenger or side-impact airbag module.

BACKGROUND ART

A typical passenger side airbag module requires a protective cover for the folded airbag. This cover protects the folded airbag during shipping and handling. It also prevents the airbag from unfolding beneath the instrument panel over the life of the vehicle.

The airbag module covers which are currently used include reinforced paper (Tyvek®) as well as molded or extruded plastic covers. Tyvek® covers are typically attached to the module with adhesives and are perforated to form a weakened region which splits to allow the airbag to break through during deployment. Plastic covers are typically attached to the module with multiple fasteners or by means of cylindrical beads that slide into channels. To permit the airbag to break through during deployment, they may be perforated, have thinned tear seams, or be designed to split at one of the capturing channels.

Tyvek® covers are easily damaged and are cumbersome to install. As a result, plastic covers are becoming the preferred method of packaging airbag modules. Slide-on plastic covers in the form of flexible tubes are particularly desirable because no fasteners are needed. On the other hand, a shortcoming of such covers is that they require the airbag to be compressed into the module to make room for the cover to be installed. Another shortcoming is that a gap must be provided around the module to permit insertion of the cover and facilitate installation. This gap is considered undesirable by many customers. One solution is to attach the end of the module housing after the airbag and cover are in place. This presents other problems, however, such as pinching of the airbag.

Accordingly, it is a primary object of the present invention to provide a plastic airbag cover which can be easily installed after an airbag module is completely assembled, including the folding and packing of the airbag. Other objects, features, and advantages will become apparent from the following description and appended claims.

DISCLOSURE OF INVENTION

The invention comprises a pair of panels, each of which extends over a portion of the folded airbag. The panels have interlocking connector members which snap together but easily separate under the force of airbag expansion.

BRIEF DESCRIPTION OF DRAWINGS

FIG. 1 is an elevational view of an airbag protective cover in accordance with this invention;

FIG. 2 is a right end view of the cover of FIG. 1;

BEST MODE FOR CARRYING OUT THE INVENTION

Figure 3:
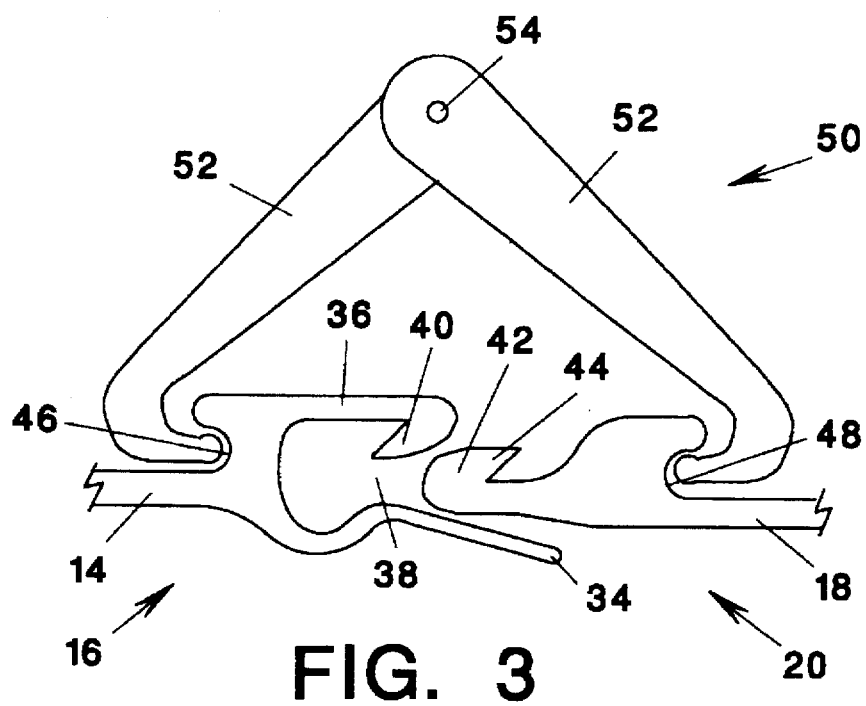
FIG. 3 is a greatly enlarged view of the connector members of the cover of FIG. 1 and the tool for engaging them.

FIGS. 1 and 2 illustrate a one piece cover 10 in accordance with the present invention. This cover 10 may be in the form of an extruded plastic sheet 12 forming the central region of the cover and terminating in a first end panel 14 bounded by a linear edge defining a female connector member 16. Adjoining the other side of the central sheet 12 is a second end panel 18 which terminates at a linear second edge defining a male connector member 20. The cover 10 may be provided with openings 22 to receive the threaded studs of a typical cylindrical inflator.

Figure 6:
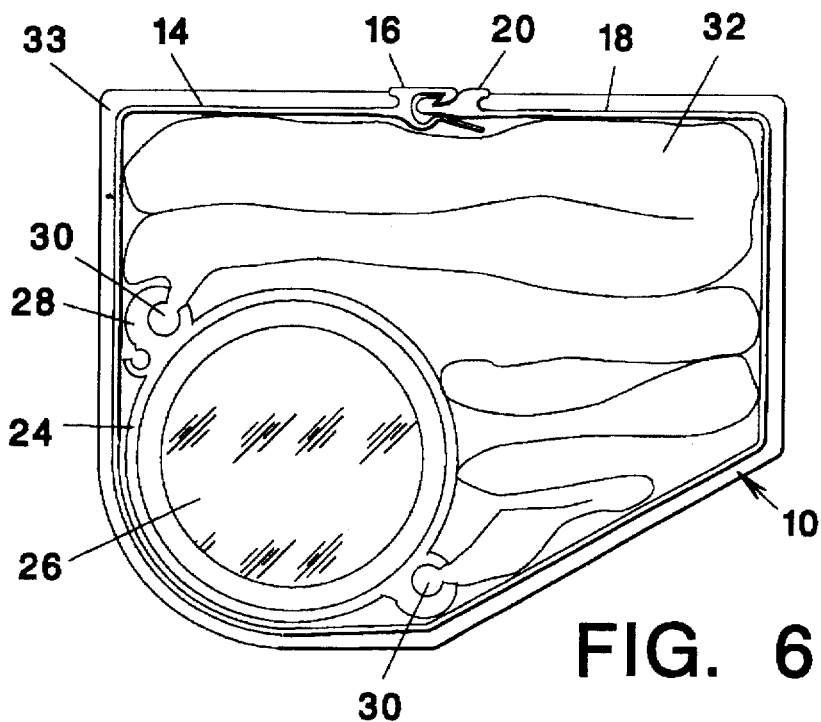
FIG. 6 is an end view of an airbag module with the near end plate removed and incorporating one embodiment of the present invention.

The cover 10 of the FIGS. 1 and 2 embodiment is shown installed in FIG. 6. As shown therein, a module 24 which may be of extruded aluminum, encloses a cylindrical inflator 26. Channels 28 on the module receive rod carrying pockets 30 which border the mouth of a folded airbag 32. The cover 10 is positioned between a far end plate 33 and a near end plate, which is removed in this drawing and encircles the module, the inflator, and the folded airbag. Its end panels 14, 18 are interconnected by means of the male 20 and female 16 connector members in a manner to be explained.

It will be understood that the cover of this invention may be extruded from any desirable plastic. It is not limited in form to a flat sheet, but may be extruded in a shape designed to fit a particular module. In one embodiment the cover had a thickness of 1.5 mm, a length (between male and female connector members) of approximately 218 mm, and a width of 280 mm.

Figure 4:
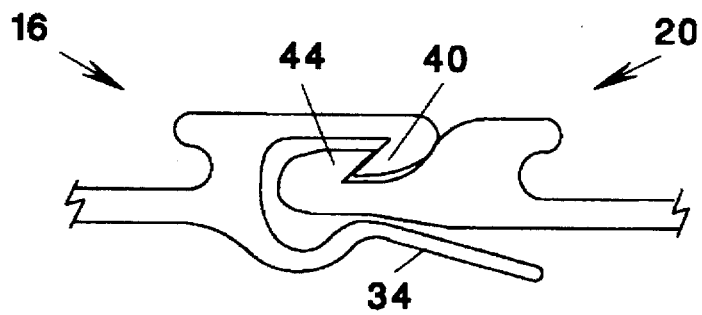
FIG. 4 is a view similar to FIG. 3, showing the connecting members in their interconnected condition.
Figure 5:
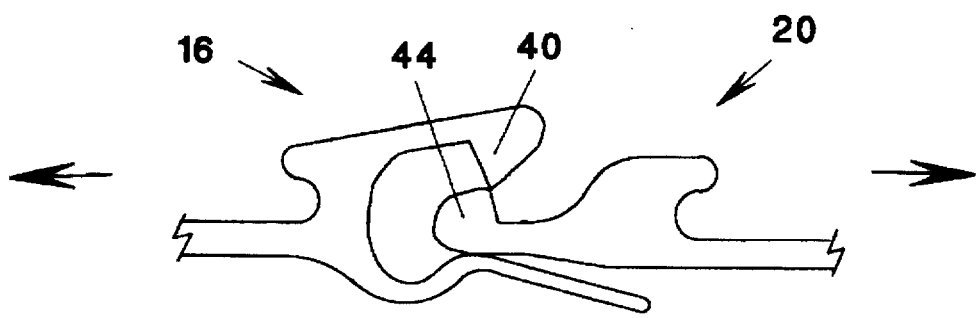
FIG. 5 is a view similar to FIG. 4, illustrating disengagement of the connecting members.

FIGS. 3–5 illustrate the construction and operation of the connector members of the cover of this invention. The female connector member 16 which extends along the width of the cover comprises a guide shelf 34. Substantially parallel to, and spaced from, the guide shelf 34 is a locking lip 36 The space between the guide shelf 34 and the locking lip 36 defines a slot 38. The outer edge of the locking lip 36 is recurved to form an inwardly and downwardly extending rib which, in cross section, forms a hook 40.

The male connector member 20 comprises a locking edge 42 which has a recurred portion forming a hook 44 complementary to the hook 40 of the female connector member. The guide shelf 34 on the female connector member is slightly angled as illustrated and, upon being advanced together, the locking edge 42 advances into the slot 38 against the spring pressure created by the deformation of the guide shelf 34. The hook 44 thereupon engages the hook 40 so that they are locked together as illustrated in FIG. 4.

The connector members of this invention are compact and have a low profile. For example, the thickness of the female connector member 16 may be less than 2 mm. As a result, closure might be best effected by use of a tool. To this end, the female connector member 16 is provided with a shouldered recess 46 and a similar shouldered recess 48 is provided on the male connector member 20. A tool 50 in the form of a plurality of caliper tongs 52 mounted on a pivot rod 54 may be employed. The tool, however, does not form a part of the present invention and need not be further described.

One advantage of this invention is that the connector members separate under the force of airbag expansion, making it unnecessary to provide a tear seam or perforations. Separation is illustrated in FIG. 5. As the airbag begins to inflate it forces the connectors outward, resulting in opposing forces as illustrated by the arrows. The resilient plastic of the connectors causes the hooks 40, 44 to deform and disengage as illustrated, thereby releasing the expanding airbag.

Figure 7:
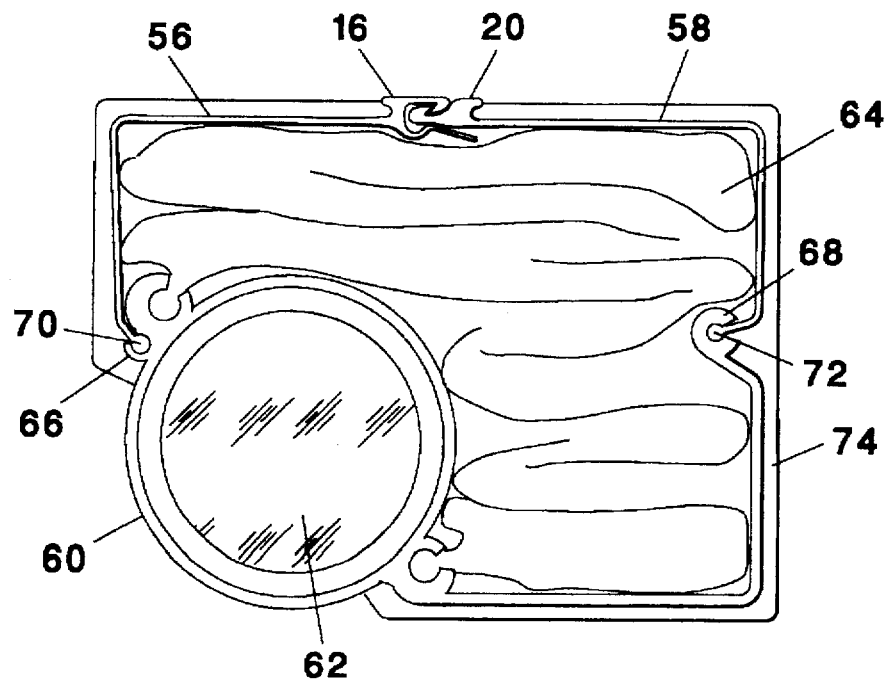
FIG. 7 is a view of an airbag module with the near end plate removed and incorporating another embodiment of the invention.

A modification of the cover of this invention is illustrated in FIG. 7. In this modification the cover is not a one-piece wraparound cover but comprises separate end panels 56, 58. The FIG. 7 modification comprises an extruded module 60 which retains an inflator 62 and airbag 64 in the same manner as the FIG. 6 embodiment. However, it also carries an additional pair of channels 66, 68. A cylindrical bead 70 extruded on the end panel 56 which carries the female connector member 16 is retained within the channel 66 and anchors the panel to the module. A similar bead 72 on the end panel 58 which carries the male connector member 20 is similarly retained within the channel 68 In the illustration of FIG. 7, as in that of FIG. 6, the near end plate is removed, leaving only the far end plate 74.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. In an automotive airbag module including a housing, an inflator enclosed by said housing, a folded airbag secured to said housing and having a mouth connected to receive gases from said inflator, and a protective cover enclosing said airbag, the improvement wherein said protective cover comprises:

a first substantially rectangular plastic panel surrounding a portion of said airbag and having a linear first edge defining a male connector member along said first edge;

a second substantially rectangular plastic panel surrounding a different portion of said airbag and having a linear second edge defining a female connector member along said second edge and positioned to receive and retain said male connector member but being releasable therefrom under the force of airbag expansion;

the female connector member comprising first and second spaced, substantially parallel members defining a slot therebetween and a recurved rib carried by the first member extending into said slot, the second member having a distal end defining a deformable angle guide shelf leading into said slot;

the male connector member comprising a locking edge inserted into said slot by deformation of the angled guide shelf and a recurved second rib carried by said locking edge hookingly engaged with the recurved rib of said female connector member, with said deformable angled guide member retaining said recurved ribs in hooking engagement until inflation of the airbag; and said engageable recurved ribs of said cover being disengageable upon inflation of the airbag by opposing forces substantially parallel with the first and second rectangular plastic panels.

2. The improvement of claim 1 wherein said first and second plastic panels are opposite ends of a single sheet encircling said housing, inflator, and airbag.

3. The improvement of claim 1 wherein said first plastic panel includes an anchoring edge parallel to its first edge and secured to said housing.

4. The improvement of claim 3 wherein said second plastic panel includes an anchoring edge parallel to its first edge and secured to said housing.

5. A protective cover for an automotive airbag module including an inflatable folded airbag, which protective cover comprises:

an extruded, substantially rectangular, plastic sheet having first and second opposite linear edges;

an extruded female connector defined by said first linear edge;

an extruded male connector defined by said second linear edge and adapted to connect with said female connector;

the female connector comprising first and second spaced, substantially parallel members defining a slot therebetween and a recurved rib carried by the first member extending into said slot the second member having a distal end defining a deformable angled guide shelf leading into said slot;

the male connector comprising a locking edge insertable into said slot by deformation of the angled guide shelf and recurved second rib carried by said locking edge hookingly engageable with the recurved rib of said female connector member, with said deformable angled guide member adapted to retain said recurved ribs in hooking engagement until inflation of the airbag; and said engageable recurved ribs of said cover being disengageable upon inflation of the airbag by opposing forces substantially parallel with the first and second rectangular plastic panels.

6. A protective cover for enclosing a folded airbag in an automotive airbag module including a housing, an inflator enclosed by said housing, the folded airbag secured to said housing and having a mouth connected to receive gases from said inflator, wherein said protective cover comprises:

a first substantially rectangular plastic panel surrounding a portion of said airbag and having a linear first edge defining a male connector member along said first edge, and a first anchoring edge parallel to said first edge and securable to said housing;

a second substantially rectangular plastic panel surrounding a different portion of said airbag and having a linear second edge defining a female connector member along said second edge, and a second anchoring edge parallel to said second edge and securable to said housing, said female connector member being positionable to receive and retain said male connector member but being releasable therefrom under the force of airbag expansion;

the female connector member comprising first and second spaced, substantially parallel members defining a slot therebetween and a recurved rib carried by the first member extending into said slot, the second member having a distal end defining a deformable angled guide shelf leading into said slot;

the male connector member comprising a locking edge insertable into said slot by deformation of the angled guide shelf and a recurved second rib carried by said locking edge hookingly engageable with the recurved rib of said female connector member, with said deformable angled guide member adapted to retain said recurved ribs in hooking engagement until inflation of the airbag; and said engageable recurved ribs of said cover being disengageable upon inflation of the airbag by opposing forces substantially parallel with the first and second rectangular plastic panels.

* * * * *